United States Patent
Vandenhaute et al.

(10) Patent No.: US 6,921,474 B2
(45) Date of Patent: Jul. 26, 2005

(54) CHLORIDE MELT PROCESS FOR THE SEPARATION AND RECOVERY OF ZINC

(75) Inventors: Joris Vandenhaute, Overpelt (BE); Eric Robert, Liège (BE)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 10/814,912

(22) Filed: Mar. 31, 2004

(65) Prior Publication Data

US 2005/0006247 A1 Jan. 13, 2005

Related U.S. Application Data

(63) Continuation of application No. PCT/EP02/11059, filed on Sep. 27, 2002.

(30) Foreign Application Priority Data

Oct. 3, 2001 (EP) .............................. 01203728

(51) Int. Cl.$^7$ ........................... C22B 19/00; C22B 1/08; C22C 3/34; C01G 9/04
(52) U.S. Cl. ....................... 205/602; 423/491; 423/500; 423/103; 423/107; 205/618
(58) Field of Search ................................. 423/491, 493, 423/500, 103, 107, 108, 99; 205/602, 618

(56) References Cited

U.S. PATENT DOCUMENTS

| | | | | |
|---|---|---|---|---|
| 4,209,501 A | * | 6/1980 | Kruesi | ........................ 423/491 |
| 4,257,914 A | * | 3/1981 | Zielke et al. | ................... 502/3 |
| 4,259,106 A | | 3/1981 | Aaltonen et al. | |
| 4,424,111 A | * | 1/1984 | Zielke et al. | ............... 208/419 |
| 4,576,812 A | | 3/1986 | von Hahn | |
| 4,800,069 A | * | 1/1989 | Fray | ............................ 423/97 |
| 5,074,910 A | | 12/1991 | Dubrovsky | |
| 5,104,445 A | * | 4/1992 | Dubrovsky et al. | ........... 75/585 |

FOREIGN PATENT DOCUMENTS

| | | | |
|---|---|---|---|
| GB | 14278 | * | 7/1899 |
| GB | 1 516 127 | | 6/1978 |
| JP | 53 25202 | | 3/1978 |
| SU | 376 465 | | 7/1971 |

OTHER PUBLICATIONS

Hill, S.D. et al "Electrowinning Zinc from Zinc Chloride in Monopolar and Bipolar Fused–Salt Cells", Report of Investigation 8524, 1981, U.S. Department of the Interior–Bureau of Mines (no month).*

* cited by examiner

Primary Examiner—Ngoc-Yen Nguyen
(74) Attorney, Agent, or Firm—Hutchison & Mason PLLC

(57) ABSTRACT

Process for the production of $ZnCl_2$ from a Zn bearing primary and/or secondary material comprising the steps of reacting the Zn bearing material with a chlorinating agent such as $Cl_2$ to convert metals into chlorides and vaporising the volatile components of the reaction product at a temperature between the melting point of said reaction product and the boiling point of $ZnCl_2$, thereby recovering a Zn rich chlorinated melt, and thereafter distilling $ZnCl_2$ from this Zn rich chlorinated melt, thereby recovering purified $ZnCl_2$ and a Zn-depleted chlorinated melt.

18 Claims, 4 Drawing Sheets

CHLORIDE MELT PROCESS FOR THE SEPARATION AND RECOVERY OF ZINC

RELATED APPLICATIONS

This application is a continuation of International Application No. PCT/EP02/11059, filed Sep. 27, 2002. The entire disclosure of International Application No. PCT/EP02/11059 is hereby incorporated herein by reference.

FIELD OF THE INVENTION

According to the present invention, a process is provided for the separation and recovery of metals, especially zinc, from zinc bearing primary and/or secondary material. More specifically, the process of the present invention relates to the conversion of the metals in the feed material to metal chlorides and subsequent recovery of the zinc and optionally other metals.

BACKGROUND OF THE INVENTION

Most present processes for zinc production require oxidic raw materials. Nowadays, the most widely used process for zinc production is the sulphate process which represented 80% of total world production in 1997. It consists of the steps of roasting, leaching, liquor purification, electro-deposition, melting and casting. The most abundant natural raw material is zinc blende (ZnS), which must be roasted to ZnO as a first step. Of course, zinc oxide recycled from other industries can be used directly without roasting.

The zinc electro-deposition is readily disturbed by extremely low levels of impurities in the electrolyte; the electrolyte liquor must therefore be rigorously purified. This means that the concentration of all the elements other than zinc present in the feed has to be lowered drastically. For instance, the following limits are generally applied: Fe less than 5 ppm, Cu less than 0.1 ppm, Co less than 0.2 ppm, As less than 0.01 ppm, Ge less than 0.005 ppm etc. In consequence, the liquor purification step is rather complicated, involves a lot of different process steps and produces many different types of residues. Some of these residues necessitate further treatment to valorise the metals they contain. Other residues, among which large quantities of iron residue in the form of jarosite or goethite, must be disposed of in ponds, a practice which is under strong environmental pressure.

Another difficulty of the sulphate process is that in order to achieve maximum recovery yields of zinc and also of other valuable impurities such as copper and cadmium, the leaching step is long and complicated, involving successive leaching operations at different acidities and temperatures.

At the turn of the 20$^{th}$ century, Swinburne and Ashcroft proposed a completely different process for the production of zinc from sulfidic material in GB 14,278. This process is known as 'chlorine smelting with fused chloride electrolysis'. The method consists in:

converting all the metals present in a sulphide ore or concentrate feed into chlorides by reacting them with chlorine, and producing elemental sulphur at the same time;

eliminating all the chlorides other than $ZnCl_2$ by cementation with zinc metal; and electrolysing the fused zinc chloride to produce pure zinc and to recover the chlorine.

Basically, in a first embodiment of the Ashcroft process called the 'wet' embodiment, the chlorination reaction produces a chloride melt, containing insoluble oxides and gangues which were not readily converted to chlorides during the chlorination step. The whole melt is then dissolved in water, in order to separate the insoluble fraction, and subjected to purification. Iron and manganese are eliminated by the addition of zinc oxide and chlorine in the aqueous solution. The other metals are cemented by the addition of Pb and/or Zn metal. The purified zinc chloride solution is then boiled down again, and a preliminary electrolysis with a rough, consumable carbon anode effects the final de-hydration of the zinc chloride before the actual zinc electrolysis.

A variation of the process consists in the cementation of all the metals with zinc, without prior dissolution in water, and is called the 'dry' embodiment. The zinc chloride is also subjected to a pre-electrolysis to ensure a sufficiently low oxide and water content. Then the actual electrolysis is carried out as above to produce molten zinc.

The Ashcroft process, although very interesting, suffers from several drawbacks. First, a lot of zinc metal is consumed in the cementation step, whether in the dry or the wet embodiment. Also, as the molten zinc chloride must be very pure for the electrolysis, the totality of the other elements must be removed from the flow, which implies a non-selective output which is difficult to valorise. Finally, particularly in the wet embodiment, a lot of energy is required to evaporate the water, and a pre-electrolysis with consumable anodes is needed to completely dry the melt. These operations are not economically interesting.

SUMMARY OF THE INVENTION

It is an object of the present invention to overcome the disadvantages of the above mentioned methods. Our main goal is to have a better control of residues. This means that clear-cut, single step separations of the different elements present in the feed are required, in order to avoid as much as possible the production of residues that must be disposed of, and to favour the production of well marketable exits for the separated by-products. Another aim is to allow a high flexibility in the feed, i.e. to be able to use, separately or together, various zinc-bearing primary or secondary materials. Another advantage over the sulphate process is that the electrolysis produces molten zinc which can be directly cast, thus avoiding the melting of zinc cathodes. Yet another advantage is the overall lower energy consumption of the process. Beside an economical interest, this is also important from the environmental point of view, since less energy means less production of greenhouse effect generating gases.

According to the present invention, a process is provided for the separation and recovery of metals, especially zinc, from zinc bearing primary and/or secondary material.

The process for the production of $ZnCl_2$ from a Zn bearing primary and/or secondary material comprises the steps of reacting the Zn bearing material with a chlorinating agent such as $Cl_2$ to convert metals into chlorides and vaporising the volatile components of the reaction product at a temperature between the melting point of said reaction product and the boiling point of $ZnCl_2$, thereby recovering a Zn rich chlorinated melt, and thereafter distilling $ZnCl_2$ from this Zn rich chlorinated melt, thereby recovering purified $ZnCl_2$ and a Zn-depleted chlorinated melt.

To this process, a further step of converting metal impurities which are present in the melt into insoluble oxides can be added. This conversion is accomplished by adding a metal oxide such as ZnO to the melt, after having recovered the Zn rich chlorinated melt and before distilling $ZnCl_2$.

During the conversion, an oxidising agent such as $Cl_2$ can be added to the melt. The insoluble oxides obtained after conversion can be separated from the melt after the step of distilling $ZnCl_2$.

During the step of reacting the Zn bearing material with a chlorinating agent, the addition of this chlorinating agent can be controlled so as to convert substantially all the Fe present in the Zn bearing material into $FeCl_2$. A further step is then added to the process including the conversion step as described before, whereby after having recovered the Zn rich chlorinated melt and before converting, Fe is volatilised as Fe(III) chloride by adding an oxidising chlorinating agent such as $Cl_2$ to the melt at a temperature between 400 and 730° C. The Fe(III) chloride obtained in this process step can be purified, e.g. by rectification using a liquid reflux carrier. Purified $ZnCl_2$ from the step of distilling $ZnCl_2$ can be fed as a liquid reflux carrier in the step of rectifying Fe(III) chloride.

The step of distilling $ZnCl_2$ in the processes described before can comprise the steps of:
- volatilising $ZnCl_2$ and other less volatile metal chlorides, thereby obtaining the Zn-depleted chlorinated melt and a Zn-rich gaseous phase; and
- rectifying the $ZnCl_2$-rich gaseous phase, thereby obtaining purified $ZnCl_2$ and metal chlorides less volatile than $ZnCl_2$.

Either one or both of purified $ZnCl_2$ and metal chlorides less volatile than $ZnCl_2$ from the step of rectifying the $ZnCl_2$-rich gaseous phase, can be fed as a liquid reflux carrier in the step of rectifying Fe(III) chloride.

To any of the processes described before, the step of subjecting the purified $ZnCl_2$ to dry electrolysis can be added for the production of metallic Zn and $Cl_2$. Preferably, $Cl_2$ is then recycled as chlorinating agent from the dry electrolysis to the step of reacting the Zn bearing material with a chlorinating agent. $Cl_2$ recycled from the dry electrolysis can also be used as an oxidising agent in the conversion of the metal impurities into insoluble oxides as mentioned above. $Cl_2$ from the step of dry electrolysis can furthermore be recycled as an oxidising chlorinating agent to the step of volatilising Fe as Fe(III) chloride as mentioned before.

Preferably, residual metal values present in the Zn-depleted chlorinated melt are separated and a metal-depleted chlorinated melt is obtained, which can be recycled for use as a solvent in the step of reacting the Zn bearing material with a chlorinated agent in the first embodiment of the invention.

DETAILED DESCRIPTION OF THE INVENTION

The process of the present invention converts the metals in a zinc bearing primary and/or secondary material to chlorides. As chlorides, they can be recovered in subsequent processing steps. In particular, zinc chloride is separated from the other chlorides by volatilisation, purified by rectification (fractional distillation), and optionally subjected to dry electrolysis, in order to recover metallic zinc of a special high grade quality, with a purity of 99.95 wt % or better.

The types of materials that can be fed to the process of the present invention are e.g. those in which the metals are found in sulphidic, oxidic, carbonatic, ferritic or silicaceous states.

Figure 1:
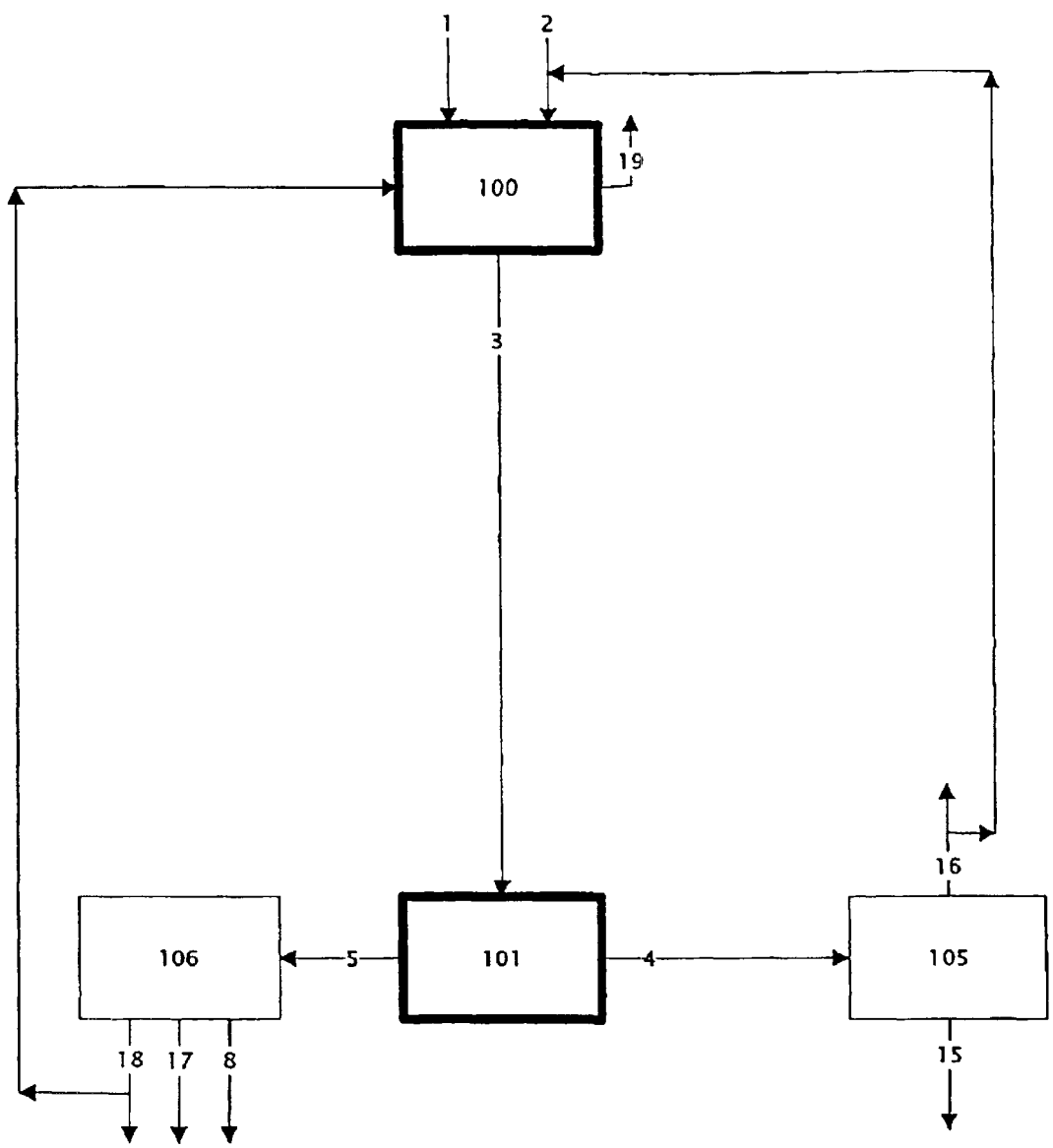
FIG. 1 provides an overview of the flowsheet of the first embodiment of the process comprising the steps of reacting Zn-bearing material with a chlorinating agent (100), distilling $ZnCl_2$ (101), electrolysing $ZnCl_2$ (105) and separating metal values (106).

The first embodiment of the process is illustrated in FIG. 1. The feed (1) to the process, typically in the form of a flowing powder, is contacted (100) with a chlorinating agent (2) such as $Cl_2$, $S_2Cl_2$ or HCl. $O_2$ can be added to facilitate the reaction, in particular when HCl is used to chlorinate sulphidic materials. While the contact between the feed and the chlorinating agent can be performed at low temperature, it is preferably performed at a temperature above 400° C., the feed being in suspension in a recycled molten salt solvent, as will be explained below. By contacting the feed and the chlorinating agent, the metal salts present in the feed are substantially converted into chlorides, leaving unreacted only the gangues and possibly some non-reactive oxides. The metal chlorides that are formed can include, depending on the nature of the feed the chlorides of: Zn, Fe, Cu, Pb, Ca, Ag, Mn, Mg, Na, K, Ba, Co, Ni, Cd, Ga, In, Sn.

If the first step was performed at low temperature, the reaction products are then heated to above their melting point. A mixture of molten salts is thus obtained. The energy to provide is generally low because the chlorination reaction is exothermic.

The most volatile reaction products are then vaporised, preferably at a temperature between 500 and 730° C., or more preferably between 550 and 650° C., and eliminated as reaction vapours of the chlorination step (19). These volatile components include the chlorides of metals such as Ta, Hg, Ga, In, Ge, Sn, As and Sb. If the feed contains sulphides, in the absence of oxygen, elemental sulphur is formed and eliminated with the reaction vapours (19). If any oxygen is present, as a gas or in oxides, $SO_2$ is formed, and is also evacuated with the reaction vapours (19). If the chlorination reaction is carried out at a sufficiently high temperature, the vaporisation of sulphur and other volatile compounds will already take place during the chlorination itself.

The resulting Zn-rich chlorinated melt (3) is then heated, preferably up to its boiling point, in order to vaporise the $ZnCl_2$ so as to separate it (101) from the other chlorides, e.g. by fractional distillation. Two fractions are thus produced: purified $ZnCl_2$ (4) and a Zn-depleted melt (5). It is neither necessary nor desirable to eliminate all of the $ZnCl_2$ from the Zn-rich chlorinated melt, particularly if the depleted melt is to be recycled as a solvent for the chlorination reaction, as $ZnCl_2$ helps to keep the melting point of the melt low, typically below 400° C.

The purified, liquid $ZnCl_2$ can then be fed in an electrolysis cell (105). This cell can be monopolar or bipolar, with electrodes consisting e.g. of graphite. Since molten $ZnCl_2$ has a poor electrical conductivity, the melt in the cell should preferably contain chlorides of metals having a redox potential more negative than $Zn^{2+}$, such as $Na^+$, $K^+$ or $Li^+$, or a mixture of them. A typical bath composition consists of 40 mole % $ZnCl_2$, 30 mole % KCl and 30 mole % NaCl. The electrolysis is performed at a temperature higher than the melting point of the salt mixture used, and preferably above the melting point of Zn (420° C.), in order to produce liquid Zn (15) that can be directly cast upon tapping. The temperature is preferably kept below 600° C. to avoid excessive fuming of the $ZnCl_2$.

The cathode reaction is:

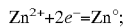

the anode reaction is

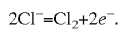

Chlorine gas (16) evolving at the anode can be recycled as a chlorinating agent (2) to the first step of the process (100).

Details about the electrolysis step can be found in e.g. 'Electrowinning Zinc from Zinc Chloride in Monopolar and Bipolar Fused-Salt Cells', Report of Investigation 8524, 1981—Bureau of Mines; S. D. Hill et al.

The Zn-depleted melt (5) can further be processed in a separation step (106). In a first step, the insoluble oxides or gangues which were not readily converted to chlorides during the chlorination step (100) can be separated by settling (8).

Then the metal values (17) can be separated, e.g. by cementation with lead or zinc. These metal values, according to the nature of the feed, can for instance contain Cu, Ag and other precious metals such as Au or Pt-group metals.

The resulting metal-depleted melt (18) can be recycled to the step of chlorination (100), to serve as solvent for the reaction. The feed is dispersed as a suspension in this solvent and the chlorinating agent is bubbled through the bath.

This first embodiment of the invention is selected when the amount of Fe in the feed is very low. Indeed, when Fe is present, it will be chlorinated: the Fe(III) in the feed becomes Fe(III) chloride, and the Fe(II) becomes $FeCl_2$. Fe(III) chloride, itself being a chlorinating agent, can react with the feed, and form $FeCl_2$. As there is no other significant purge of iron in this embodiment, an excess of the chlorinating agent has to be added to form Fe(III) chloride. This Fe(III) chloride is relatively volatile, and will be partially eliminated with the other volatile components in the reaction vapours (19). However, some iron chloride will be passed to the distillation step (101) and will then be vaporised together with the $ZnCl_2$, thereby contaminating the purified $ZnCl_2$ (4). If the amount of Fe in the feed is sufficiently low, this might be acceptable. If not, then the second embodiment of the process provides a solution, as set out next.

Figure 2:
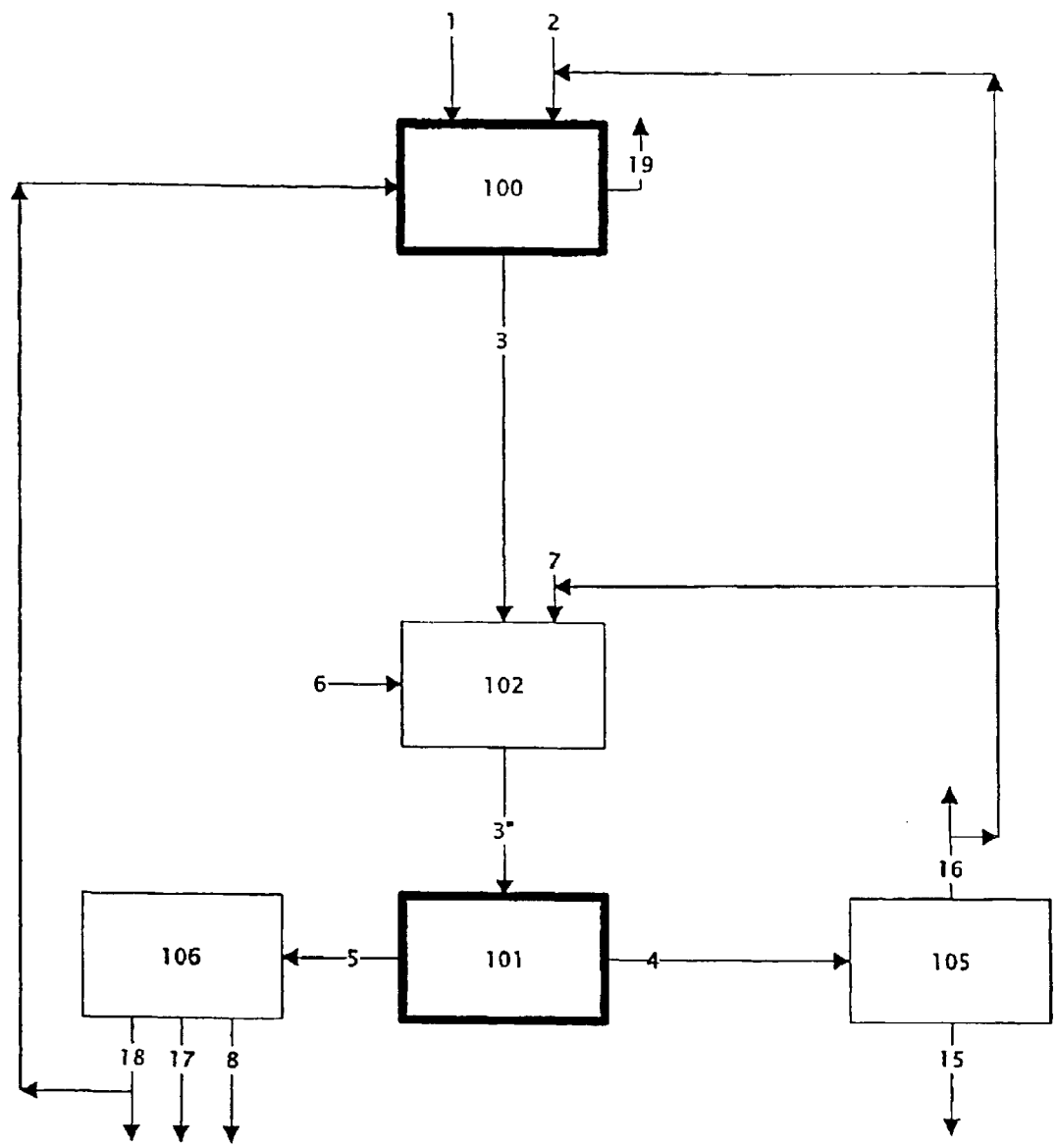
FIG. 2 provides an overview of the flowsheet of the second embodiment comprising the steps of reacting Zn-bearing material with a chlorinating agent (100), converting chlorides to oxides (102), distilling $ZnCl_2$ (101), electrolysing $ZnCl_2$ (105) and separating oxides and metal values (106).

The second embodiment of the process is illustrated in FIG. 2. There, the feed (1) is contacted with a chlorinating agent (2) in the chlorination step (100), as explained above, and the operation is conducted until a Zn-rich chlorinated melt (3) is obtained. It is preferable that during said chlorination step (100) the addition of the chlorinating agent (2) is controlled in such a way that substantially no Fe(III) chloride is formed. This can be done by stopping the addition of the chlorinating agent as soon as brown fumes appear. The needed amount of chlorinating agent can also be calculated, based on the stoechiometry of the reaction and the amount of zinc-bearing material to be chlorinated.

Then, in a conversion step (102), a metal oxide-bearing compound (6) such as PbO, CaO, $CaCO_3$, or preferably ZnO, is added to the melt. The added oxide can precipitate substantially all the oxides of Fe(III), Mg and Ni (if present in the feed), and partially the oxides of Fe(II), Mn(II) and Co(II). Subsequently, or preferably at the same time, a small amount of an oxidising agent (7) such as chlorine gas is added to the melt, whereby Fe(II), Mn and Co will be oxidised to a state enabling the precipitation of a major part of their oxides. However, adding too much oxidising agent may cause the oxides to re-dissolve.

After this conversion, the resulting melt (3") is heated, preferably up to its boiling point, in order to vaporise the $ZnCl_2$ so as to separate it (101) from the other chlorides, e.g. by fractional distillation. Two fractions, purified $ZnCl_2$ (4) and a Zn-depleted melt (5), are obtained as set out in the first embodiment. The purified $ZnCl_2$ (4) can then be fed in an electrolysis cell (105), where it is processed as explained above.

At the anode, chlorine gas is evolved (16). This gas can be recycled as a chlorinating agent (2) to the first step of the process (100), but also as an oxidising agent (7) to the conversion step (102).

The Zn-depleted melt (5) can then further be processed in a separation step (106). In a first phase, oxides of Fe, Mg, Mn, Ni and Co formed in the conversion step (102) are separated e.g. by settling (8), together with the insoluble gangues which were not converted to chlorides during the chlorination step (100).

Then the metal values (17) can be separated. These metal values, according to the nature of the feed, can for instance contain Cu, Ag and other precious metals such as Au or Pt-group metals. The resulting metal-depleted melt (18) can be recycled to the step of chlorination (100), as explained above.

In this embodiment, some or all of the Fe present in the melt after the chlorination (100) is blocked as an oxide during the conversion (102), and does not contaminate the purified $ZnCl_2$ (4). However, this method is practical only if the amount of Fe in the flow (3) from the chlorination step (100) is low, in particular lower than 2 wt %. Indeed, if it is too high, some iron will still be present in the flow after the conversion step (102), even if an excess of oxide is added, and it may contaminate the purified $ZnCl_2$ (4). In that case, the third embodiment set out below, provides a solution to this problem.

Figure 3:
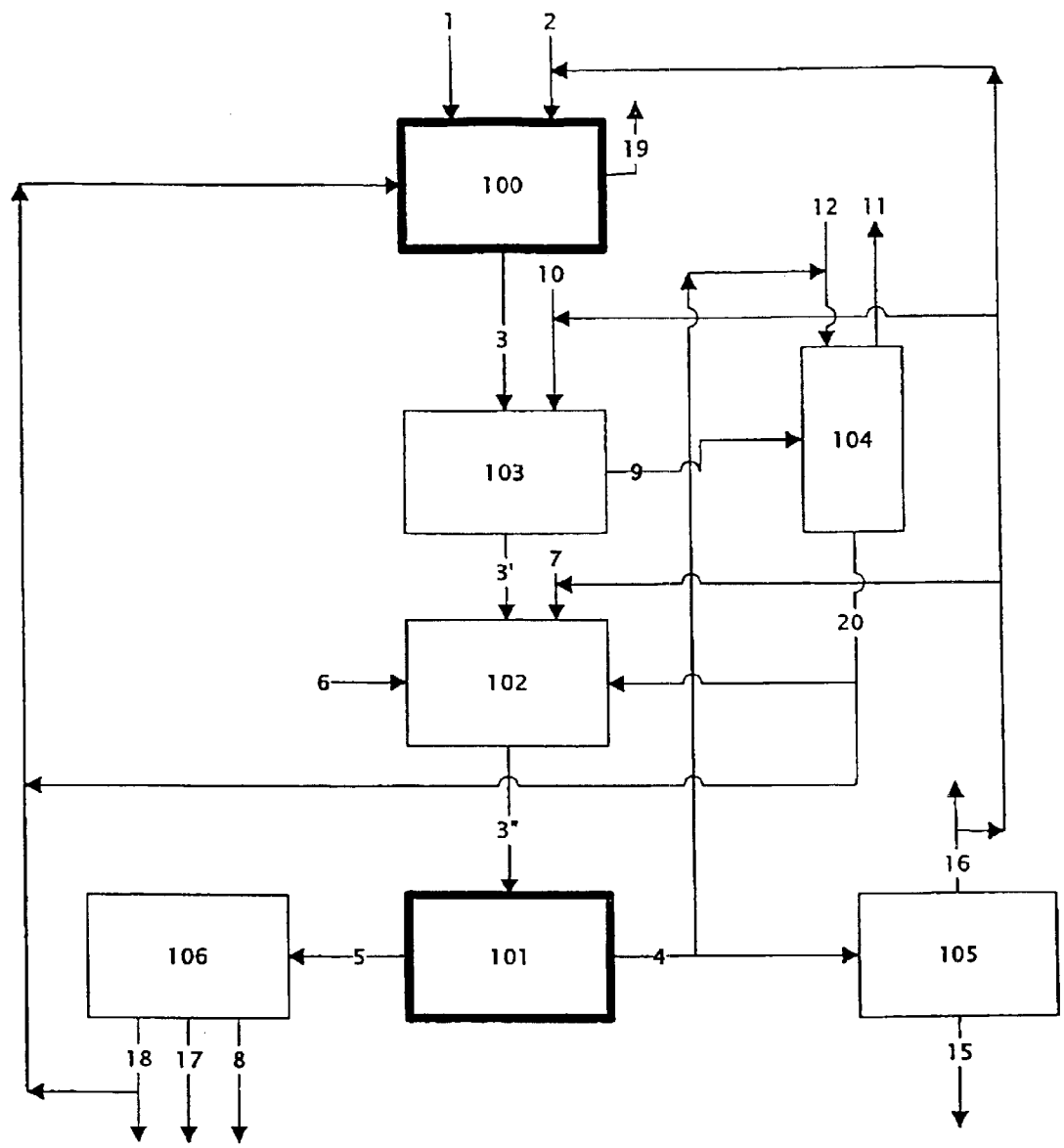
FIG. 3 provides an overview of the flowsheet of the third embodiment comprising the steps of reacting Zn-bearing material with a chlorinating agent (100), volatilising Fe as Fe(III) chloride (103), purifying Fe(III) chloride (104), converting chlorides to oxides (102), distilling $ZnCl_2$ (101), electrolysing $ZnCl_2$ (105) and separating oxides and metal values (106).
Figure 4:
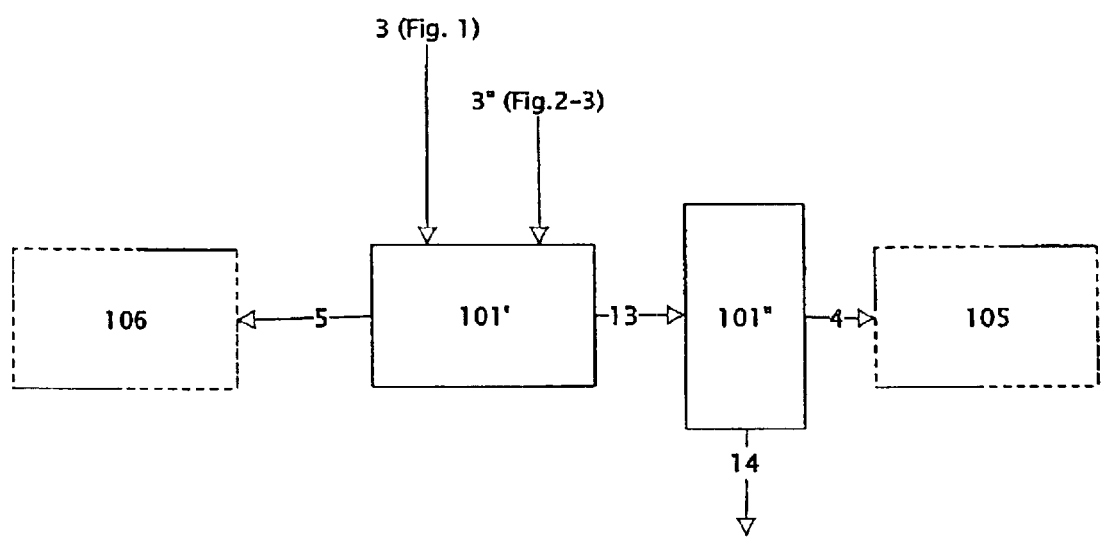
FIG. 4 provides an overview of the distillation of the zinc chloride, comprising the steps of volatilising a $ZnCl_2$-rich phase (101') and rectifying the $ZnCl_2$-rich phase (101").

This third embodiment of the process is illustrated in FIG. 3. Here, Fe is preferentially eliminated in an iron volatilisation step (103) taking place after the chlorination step (100) and the elimination of the reaction vapours (19). Therefore, during said chlorination step (100) the addition of the chlorinating agent (2) is controlled in such a way that substantially no Fe(III) chloride is formed, as explained above. In the iron volatilisation step (103), Fe is eliminated by injection of an oxidising chlorinating agent (10) such as chlorine into the melt. The formed Fe(III) chloride is volatilised (9) at a temperature comprised between 400 and 730° C., preferably between 600 and 700° C. This elimination cannot reach 100%, but the aim is to lower the Fe concentration to a level where it can be blocked by the addition of oxides in the subsequent conversion step (102), as was explained in the second embodiment.

The volatilised Fe(III) chloride (9) contains some $ZnCl_2$. This mixture can be purified (104) by selectively condensing the zinc chloride, e.g. by using a rectifying column for producing pure Fe(III) chloride (11). A good separation implies a contact between a liquid and a gas phase. Since the temperature range for the molten state of Fe(III) chloride is very limited, this distillation is carried out efficiently when using a liquid reflux carrier (12). This carrier is preferably a recycled stream from the flow sheet as will be explained below, or a chloride whose vapour pressure is low at the working temperature, e.g. NaCl. The reflux flow (20) from the bottom of the rectifying column, which is rich in liquid reflux carrier, can be recycled to the chlorination step (100) or to the conversion step (102).

The Fe-depleted melt (3') exiting from the iron volatilisation step (103) is then subjected to the conversion step (102), as in the second embodiment. Here the Fe, already being present as Fe(III), precipitates directly as $Fe_2O_3$ upon addition of a metal oxide-bearing compound (6) such as PbO, CaO, $CaCO_3$, or preferably ZnO. The oxides of Mg and Ni are also substantially precipitated, and partially the oxides of Mn and Co. A small amount of oxidising agent (7) such as chlorine gas can be added to the melt to oxidise Mn and Co to a state enabling a precipitation of the major part of their oxides.

After this step, the resulting converted Fe-poor melt (3") is heated, preferably up to its boiling point, in order to vaporise the $ZnCl_2$ so as to separate it from the other chlorides e.g. by fractional distillation (101). Purified $ZnCl_2$ (4) and a Zn-depleted melt (5) are produced as in the previous embodiments. The purified $ZnCl_2$ (4) can then be fed in an electrolysis cell (105), where it is processed as explained above. A small part of this $ZnCl_2$ can be used as liquid reflux carrier (12) for the Fe(III) chloride distillation (104).

At the anode of the electrolysis cell, chlorine gas is evolved (16). This gas can be recycled as a chlorinating agent (2) to the first step of the process (100), but also as an oxidising agent (7) for the conversion step (102), and as a chlorinating agent (10) for the elimination of Fe as Fe(III) chloride by volatilisation (103).

The Zn-depleted melt (5) can then be further processed in a separation step (106), as in the previous embodiments, for producing an oxide residue (8) and recovering metal values (17). The resulting metal-depleted melt (18) can be recycled to the chlorination step (100) as explained above.

In order to achieve a still better separation of the different elements, especially when the feed contains lead and/or cadmium, the $ZnCl_2$ distilling step (101) is performed in two steps. First, in a flash evaporation step, the converted Fe-poor melt (3"), or in the case of the first embodiment, the Zn-rich chlorinated melt (3), is heated, preferably up to its boiling point, in order to volatilise (101') $ZnCl_2$ together with a fraction of other less volatile metal chlorides such as $PbCl_2$ and $CdCl_2$, thereby obtaining a Zn-depleted melt (5) and a $ZnCl_2$-rich gaseous phase (13). This flow (13) is rectified in a distillation column (101"), producing pure $ZnCl_2$ (4) and, at the bottom of the column, a melt composed of the metal chlorides less volatile than $ZnCl_2$, in particular $PbCl_2$ and $CdCl_2$ (14). This melt can be processed further to valorise said components. For instance, a mixture of $PbCl_2$ and $CdCl_2$ can be subjected to electrolysis to produce metallic Pb and Cd. Both metals can then easily be separated from each other, e.g. by vaporisation.

Part of the obtained metal chlorides less volatile than $ZnCl_2$ (14) may also be used as liquid reflux carrier (12) for the Fe(III) chloride distillation (104).

The purified $ZnCl_2$ (4), and the Zn-depleted chlorinated melt (5) can be further processed as explained in embodiments 1 to 3.

The following examples illustrate the main steps of the process of the invention.

EXAMPLE 1

Chlorination of Zinc Blende

This example demonstrates the ability of the process to leach a blende concentrate (process step 100: reacting Zn bearing material with chlorinating agent).

2 kg of a molten solvent was prepared by mixing chloride salts in a quartz reactor. The composition of the solvent was: 51 mol % $ZnCl_2$, 11.3 mol % $PbCl_2$, 3 mol % $CdCl_2$, 2 mol % KCl, 12.1 mol % NaCl, 17.4 mol % $CaCl_2$, 2.4 mol % CuCl, 0.8 mol % $BaCl_2$. The mixture was heated to 600° C. under nitrogen. 1.6 kg of a blende concentrate was gradually added to the melt. The blende contained 50.6 wt % Zn, 9.2 wt % Fe, 1.8 wt % Pb, 0.1 wt % Cd, 0.23 wt % Cu, 33 wt % S. Chlorine gas was introduced by a quartz injection tube located at the bottom of the reactor, at a rate of 500 cc/min during 13 h. Sulphur was evolved from the reactor and collected in a condenser.

In order to evaluate the chlorination, the resulting melt was dissolved in 5 l of a NaCl 5 M solution, which favours the dissolution of the formed chlorides. The solid residue was filtered out of the solution and analysed for base metals content. Table 1 shows the extraction yield.

TABLE 1

| extraction yield of base metals during chlorination of a blende concentrate | |
|---|---|
| Metal | Extraction yield (%) |
| Zn | 99.9 |
| Fe | 98.7 |
| Pb | 96.2 |
| Cd | 98.5 |
| Cu | 97.8 |

The process achieved very high extraction yields for the main components of the blende in one single leaching step.

EXAMPLE 2

Chlorination of an Oxide Feed

This example demonstrates the ability of the process to leach an oxide feed (process step 100: reacting Zn bearing material with chlorinating agent).

2 kg of a molten solvent was prepared by mixing chloride salts in a quartz reactor. The composition of the solvent was: 51 mol % $ZnCl_2$, 11.3 mol % $PbCl_2$, 3 mol % $CdCl_2$, 2 mol % KCl, 12.1 mol % NaCl, 17.4 mol % $CaCl_2$, 2.4 mol % CuCl, 0.8 mol % $BaCl_2$. The mixture was heated to 600° C. under nitrogen. 1 kg of Waelz oxide was gradually added to the melt. The oxide contained 56 wt % Zn, 3.32 wt % Fe, 7.9 wt % Pb. Chlorine gas was introduced by a quartz injection tube located at the bottom of the reactor, at a rate of 500 cc/min during 10 h.

In order to evaluate the chlorination, the resulting melt was dissolved in 5 l of a NaCl 5 M solution, which favours the dissolution of the formed chlorides. The solid residue was filtered out of the solution and analysed for its base metals content. Table 2 shows the extraction yield.

TABLE 2

| extraction yield of base metals during chlorination of an oxide | |
|---|---|
| Metal | Extraction yield (%) |
| Zn | 99.7 |
| Fe | 65.0 |
| Pb | 97.5 |

The process achieved very high extraction yields for Zn and Pb; the Fe yield is lower than with blende because $Fe_2O_3$ is less reactive than the iron sulphide.

EXAMPLE 3

Fe(III) Chloride Elimination

This example demonstrates the ability of the process to eliminate iron from the melt (process step 103: volatilising Fe as Fe(III) chloride).

A melt was prepared by chlorination of 2 kg of zinc blende with chlorine gas, in 1.8 kg of molten solvent. The zinc blende and the molten solvent had the same composition as in Example 1. After the chlorination, the melt contained 4 wt % of Fe, which is too much to be blocked as $Fe_2O_3$ by addition of e.g. ZnO, as explained above.

Chlorine gas was injected in the melt at a flow rate of 500 ml/min during 6 h. The temperature of the melt was 620° C. The experiment was stopped when almost no brown fumes (indicating the presence of Fe(III) chloride) were produced anymore. The analysis of the melt showed that the residual Fe content was 0.21 wt %, and thus that 95.8% of the Fe had been eliminated. The final Fe content is well below the limit of 2 wt % and can thus be blocked as an oxide. In those conditions, the contamination of $ZnCl_2$ by iron will be negligible.

EXAMPLE 4

Precipitation of Oxides

This example demonstrates the ability of the process to precipitate the oxides of Fe, Mg, Mn, Co and Ni (process step 102: converting).

A melt was prepared with the following composition (in wt %): 46.2 $ZnCl_2$, 17.1 $PbCl_2$, 14.1 $CaCl_2$, 3.8 CuCl, 3 $CdCl_2$, 2.7 $MnCl_2$, 2.4 $FeCl_3$, 2.4 $CoCl_2$, 2 $MgCl_2$, 1.9 $NiCl_2$, 1.3 AgCl, 1.1 $BaCl_2$, 1 KCl, 0.9 NaCl. The total weight was 1 kg. The salts were heated, melted and kept at a temperature of 600° C. 110 g ZnO was added to the melt, and then $Cl_2$ was bubbled through the mixture. 44 g of $Cl_2$ was added subsequently.

The amounts of metals in solution, and the amounts present as solid residue were determined. The percentage of precipitated metals, with ZnO only and with the subsequent addition of chlorine is presented in Table 3.

TABLE 3 precipitation yield of metals

| | Fe | Mg | Ni | Mn | Co |
|---|---|---|---|---|---|
| Precipitation yield without $Cl_2$ (%) | 94 | 93 | 88 | 18 | 15 |
| Precipitation yield with $Cl_2$ (%) | 100 | 93 | 87 | 76 | 73 |

The purge of Mg, Ni, Mn and Co, together with the blocking of the last traces of Fe, with the addition of ZnO and $Cl_2$ is thus efficient and constitutes an exit for these elements.

EXAMPLE 5

$ZnCl_2$ Flash Evaporation

This example demonstrates the ability of the process to separate $ZnCl_2$, $PbCl_2$ and $CdCl_2$ from the other components of the melt (process step 101': volatilising $ZnCl_2$).

A melt was prepared by chlorination of 2 kg of blende and elimination of Fe as in Example 3. 50 g of ZnO was added to the melt to block the remaining iron as $Fe_2O_3$. In a consecutive step, the temperature of the melt was raised to 800° C. to vaporise $ZnCl_2$, together with some $PbCl_2$ and $CdCl_2$. 70% of the $ZnCl_2$ initially present was evaporated. The vapours were condensed in an air-cooled reactor and analysed. They consisted of $ZnCl_2$ and some other elements. The concentrations of these elements before and after the flash evaporation, and the percentage of extraction, are given in Table 4.

TABLE 4 concentration of metals before and after flash evaporation.

| | Pb | Cd | Fe | Cu | Mn |
|---|---|---|---|---|---|
| In melt before evaporation (ppm) | 208248 | 30621 | 13643 | 22343 | 3934 |
| In condensed gas phase (ppm) | 33000 | 4200 | 129 | 102 | 43 |
| Extraction yield (%) | 20 | 13.8 | 0.95 | 0.35 | 0.84 |

The results show that the process can satisfactorily extract the $ZnCl_2$ from the chlorinated melt, together with a sufficient amount of $PbCl_2$ and $CdCl_2$ to constitute an efficient purge. This purge is only slightly contaminated by Fe, Cu and Mn.

EXAMPLE 6

Rectification of $ZnCl_2$

This example demonstrates the ability of the process to deliver pure $ZnCl_2$ (process step 101": rectifying the Zn-rich gaseous phase).

The melt obtained after the flash evaporation, as described in Example 5, was subjected to a distillation using a rectification column. The melt, placed in a boiler under the column, was heated up to 800° C. The distillate was condensed and analysed. The total amount of impurities in the melt was about 10 ppm. The most important impurities are reported in Table 5.

TABLE 5 impurities in $ZnCl_2$ after rectification

| | Fe | Pb | Cd | Cu | Mn |
|---|---|---|---|---|---|
| (ppm) | 2 | 0.86 | 0.09 | 0.7 | <0.1 |

The process is thus able to produce a very pure $ZnCl_2$. This $ZnCl_2$, when electrolysed, will yield Zn metal meeting at least commercial Special High Grade specifications.

LIST OF REFERENCE NUMERALS USED

Process Steps
100 reacting Zn bearing material with chlorinating agent
101 distilling $ZnCl_2$
102 converting
103 volatilising Fe as Fe(III) chloride
104 purifying Fe(III) chloride
105 electrolysis
106 separating metal values
101' volatilising $ZnCl_2$
101" rectifying the $ZnCl_2$-rich gaseous phase
Streams
1 Zn bearing primary and/or secondary material
2 chlorinating agent 3 Zn rich chlorinated melt
3' Fe-depleted melt
3" converted Fe-poor melt
4 purified $ZnCl_2$
5 Zn-depleted chlorinated melt
6 metal oxide
7 oxidising agent
8 insoluble oxide residue
9 Fe(III) chloride
10 oxidising chlorinating agent
11 purified Fe(III) chloride
12 liquid reflux carrier
13 $ZnCl_2$-rich gaseous phase
14 metal chlorides less volatile than $ZnCl_2$
15 metallic Zn
16 $Cl_2$
17 metal values
18 metal-depleted chlorinated melt
19 reaction vapours of the chlorination step
20 reflux flow from Fe(III) chloride rectifying column

What is claimed is:

1. A process for the production of $ZnCl_2$ from a Zn bearing primary and/or secondary material, comprising the steps of:
   reacting the Zn bearing material with a chlorinating agent to convert metals present in the Zn bearing material into chlorides to form a reaction product and vaporising components of the reaction product more volatile that $ZnCl_2$ at a temperature between the melting point of said reaction product and the boiling point of $ZnCl_2$, thereby recovering a Zn rich chlorinated melt,
   converting metal impurities which are present in said Zn rich chlorinated melt into insoluble oxides by adding a metal oxide to the melt, and subsequently
   distilling $ZnCl_2$ from the Zn rich chlorinated melt, thereby recovering purified $ZnCl_2$ and a Zn-depleted chlorinated melt.

2. The process of claim 1, wherein the chlorinating agent is $Cl_2$.

3. The process of claim 1, wherein the metal oxide is ZnO.

4. The process of claim 1, wherein, during the converting step, an oxidising agent is added to the melt.

5. The process of claim 4, wherein the oxidising agent is $Cl_2$.

6. The process of claim 1, further comprising separating the insoluble oxides from the Zn-depleted chlorinated melt after the step of distilling $ZnCl_2$.

7. The process of claim 1, wherein during the step of reacting the Zn bearing material with a chlorinating agent the addition of said chlorinating agent is controlled so as to convert substantially all the Fe present in the Zn bearing material into $FeCl_2$, and further comprising the step of, after having recovered the Zn rich chlorinated melt and before converting:
   volatilising Fe as Fe(III) chloride by adding an oxidising chlorinating agent to the melt at a temperature between 400 and 730° C.

8. The process of claim 7, wherein the oxidising chlorinating agent is $Cl_2$.

9. The process of claim 7, further comprising the step of producing purified Fe(III) chloride by rectifying Fe(III) chloride using a liquid reflux carrier.

10. The process of claim 9, wherein purified $ZnCl_2$ from the step of distilling $ZnCl_2$ is fed as a liquid reflux carrier in the step of rectifying Fe(III) chloride.

11. The process of claim 1, wherein the step of distilling $ZnCl_2$ comprises the steps of:
   volatilising $ZnCl_2$ and other less volatile metal chlorides, thereby obtaining the Zn-depleted chlorinated melt and a $ZnCl_2$-rich gaseous phase, and
   rectifying the $ZnCl_2$-rich gaseous phase, thereby obtaining the purified $ZnCl_2$ and metal chlorides less volatile than $ZnCl_2$.

12. The process of claim 9, wherein:
   the step of distilling $ZnCl_2$ comprises the steps of:
      volatilising $ZnCl_2$ and other less volatile metal chlorides, thereby obtaining the Zn-depleted chlorinated melt and a $ZnCl_2$-rich gaseous phase, and
      rectifying the $ZnCl_2$-rich gaseous phase, thereby obtaining the purified $ZnCl_2$ and metal chlorides less volatile than $ZnCl_2$, and
   either one or both of purified $ZnCl_2$ and metal chlorides less volatile than $ZnCl_2$ from the step of rectifying the Zn-rich gaseous phase, is fed as a liquid reflux carrier in the step of rectifying Fe(III) chloride.

13. A process for the production of metallic Zn and $Cl_2$ comprising the steps of:
   reacting the Zn bearing material with a chlorinating agent to convert metals present in the Zn bearing material into chlorides to form a reaction product and vaporising components of the reaction product more volatile than $ZnCl_2$ at a temperature between the melting point of said reaction product and the boiling point of $ZnCl_2$, thereby recovering a Zn rich chlorinated melt,
   converting metal impurities which are present in said Zn rich chlorinated melt into insoluble oxides by adding a metal oxide to the melt,
   distilling $ZnCl_2$ from the Zn rich chlorinated melt, thereby recovering purified $ZnCl_2$ and a Zn-depleted chlorinated melt, and
   subjecting the purified $ZnCl_2$ to dry electrolysis to produce metallic Zn and $Cl_2$.

14. The process of claim 13, wherein $Cl_2$ produced in the electrolysis step is recycled as chlorinating agent to the step of reacting the Zn bearing material with a chlorinating agent.

15. The process of claim 13, wherein, during the converting step, an oxidising agent is added to the melt and wherein $Cl_2$ produced in the electrolysis step is recycled as oxidising agent to the step of converting.

16. The process of claim 13, wherein during the step of reacting the Zn bearing material with a chlorinating agent the addition of said chlorinating agent is controlled so as to convert substantially all the Fe present in the Zn bearing material into $FeCl_2$, and further comprising the step of, after having recovered the Zn rich chlorinated melt and before converting:
   volatilising Fe as Fe(III) chloride by adding an oxidising chlorinating agent to the melt at a temperature between 400 and 730° C.; and
   wherein $Cl_2$ produced in the electrolysis step is recycled as oxidising chlorinating agent to the step of volatilising Fe as Fe(III) chloride.

17. The process of claim 1, further comprising the step of separating metal values present in the Zn-depleted chlorinated melt, thereby obtaining a metal-depleted chlorinated melt.

18. The process of claim 17, wherein the metal-depleted chlorinated melt is recycled for use as a solvent in the step of reacting the Zn bearing material with a chlorinating agent.

* * * * *